US011396732B2

United States Patent
Liu et al.

(10) Patent No.: US 11,396,732 B2
(45) Date of Patent: Jul. 26, 2022

(54) FREE-SLIDING SEABED MUDMAT FOUNDATION

(71) Applicant: DALIAN UNIVERSITY OF TECHNOLOGY, Liaoning (CN)

(72) Inventors: Jun Liu, Liaoning (CN); Congcong Han, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/258,404

(22) PCT Filed: Feb. 23, 2019

(86) PCT No.: PCT/CN2019/075976
§ 371 (c)(1),
(2) Date: Jan. 6, 2021

(87) PCT Pub. No.: WO2020/133666
PCT Pub. Date: Jul. 2, 2020

(65) Prior Publication Data
US 2021/0277619 A1    Sep. 9, 2021

(30) Foreign Application Priority Data
Dec. 24, 2018  (CN) .......................... 201811578584.5

(51) Int. Cl.
*E02D 27/52*    (2006.01)
*E02D 27/04*    (2006.01)
(Continued)

(52) U.S. Cl.
CPC ............. *E02D 27/52* (2013.01); *E02D 27/04* (2013.01); *E02D 27/46* (2013.01); *E02D 27/525* (2013.01); *E02D 31/08* (2013.01)

(58) Field of Classification Search
CPC ......... E02D 27/52; E02D 27/04; E02D 27/46; E02D 27/525; E02D 31/08
See application file for complete search history.

(56) References Cited

U.S. PATENT DOCUMENTS 4,720,214 A * 1/1988 Brasted .................. E02D 27/42
                                                405/227
5,014,474 A * 5/1991 Fyfe ........................ E04H 9/022
                                                52/167.8

(Continued)

FOREIGN PATENT DOCUMENTS

CN      201963273 U      9/2011
CN      202140731 U      2/2012
(Continued)

OTHER PUBLICATIONS

Office Action corresponding to Chinese application No. 201811578584.5 dated Dec. 5, 2019. (pp. 7).

*Primary Examiner* — Carib A Oquendo
(74) *Attorney, Agent, or Firm* — Muncy, Geissler, Olds & Lowe, P.C.

(57) ABSTRACT

The present invention relates to a free-sliding seabed mudmat foundation, which belongs to the fields of offshore and ocean engineering. The mudmat comprises a base foundation, an upper foundation, and a cover plate. The base foundation sits on the seabed to support dead weights of the mudmat itself and the subsea production system fixed on the mudmat. The upper foundation, with a plurality of universal rolling ball bearing being attached to the bottom, can slide on the base foundation when it is subjected to a horizontal push force generated by the pipeline during operation. Therefore, the axial load on the pipeline during operation due to heating and pressurization is released and the buckling failure risk is then reduced. The mudmat disclosed has smaller size and lighter weight, which is beneficial in (Continued)

reducing fabrication costs and reducing requirements for cranes on the pipeline laying vessel.

10 Claims, 5 Drawing Sheets

(51) Int. Cl.
    *E02D 27/46*     (2006.01)
    *E02D 31/08*     (2006.01)

(56) References Cited

U.S. PATENT DOCUMENTS

| | | | |
|---|---|---|---|
| 2005/0084338 A1* | 4/2005 | Skeels | E02D 27/52 |
| | | | 405/226 |
| 2011/0150576 A1 | 6/2011 | Alliot | |
| 2015/0308138 A1* | 10/2015 | Henderson | E04H 9/0235 |
| | | | 52/167.4 |
| 2016/0025240 A1* | 1/2016 | Du | F16L 1/16 |
| | | | 405/184.4 |
| 2017/0350152 A1* | 12/2017 | Moreno | E02D 31/08 |

FOREIGN PATENT DOCUMENTS

| | | |
|---|---|---|
| CN | 204532290 U | 8/2015 |
| CN | 107313723 A | 11/2017 |

* cited by examiner

FREE-SLIDING SEABED MUDMAT FOUNDATION

FIELD OF THE INVENTION

The present invention relates to a free-sliding seabed mudmat foundation, which can be applied to the fields of offshore engineering and ocean engineering.

BACKGROUND OF THE INVENTION

Subsea mudmat foundations are used to support varied subsea infrastructures, such as manifolds, pipeline span protection devices, wellhead base structures, flow limiting valves, isolation valves, pipeline end terminations (PLETs), etc. The pipeline, connected to the madmat, expands axially due to heating and pressurization during operation, and hence a horizontal push force will act on the mudmat. In conventional design, the mudmat should resist the horizontal push force, i.e. the mudmat doesn't slide on the seabed surface by reacting against the horizontal push force. Therefore, the mudmat should be large enough to meet the requirements in anti-slide design.

Generally, both the mudmats and pipelines are installed by a pipeline laying vessel. If the size of the mudmat is too large to meet the loading or hoisting capacity of the pipeline laying vessel, an additional large installation vessel is required for specially installing the mudmat. This will significantly increase the installation cost. Recently, tolerably mobile mudmats are proposed in order to reduce the size and weight of the mudmat. The tolerably mobile mudmat is allowed to horizontally slide on the seabed surface when subjected to horizontal push force generated by the pipeline due to heating and pressurization during operation, hence the axial load on the pipeline is released to some extent. The tolerably mobile mudmat slides forwards when the pipeline expands during operation, while slides backwards to the original position when the pipeline is shut.

The seabed soils beneath the mudmat are subjected to large shear strains when the tolerably mobile mudmat slides on the seabed surface. The sliding process will result in the accumulation of the excess pore water pressure and the strain-softening of the soil. Hence the seabed soils beneath the mudmat settle due to shear deformation. When the mudmat rests on the seabed, the soils beneath the mudmat start to consolidate due to dissipation of the pore water pressure. The tolerably mobile mudmat experiences periodic horizontal slides generated by the pipeline expansion and contraction due to start-up and shutdown operations. Therefore, the mudmat-seabed interaction is very complex. Moreover, the mudmat is subjected to moment and torsion caused by the horizontal push force generated by the pipeline due to heating and pressurization, causing the mudmat to rotate or tilt. Under extreme conditions, the joint point between the pipeline and the subsea infrastructure even fails.

SUMMARY OF THE INVENTION

A free-sliding seabed mudmat foundation is disclosed herein to reduce the horizontal push force acting on the mudmat generated by the pipeline due to heating and pressurization. The mudmat in the present invention has less size and lighter weight compared with conventional mudmats, which is beneficial in reducing the fabrication and transportation costs. Moreover, the risk of the buckling failure of the pipeline due to heating and pressurization is reduced attributed to the free-sliding property of the mudmat in the present invention. In addition, the mudmat disclosed herein can avoid the vertical settlement of the seabed soil beneath the mudmat due to strain-softening during cyclic extensions and retractions of the pipeline.

In the following, the technical solution of the invention is stated.

A free-sliding seabed mudmat foundation is mainly comprised of a base foundation 1, an upper foundation 2, and a cover plate 3. The base foundation sits on the seabed to support the dead weights of the free-sliding seabed mudmat foundation and a subsea infrastructure 4. The base foundation 1 further has an inner space to accommodate the upper foundation 2, which can slide in the base foundation. The cover plate 3 is fixed on the top of the base foundation 1.

The base foundation 1 mainly comprises a base plate 11, a plurality of lateral baffles 12, and a plurality of skirts 14. The skirts 14 are symmetrically attached to the bottom of the base plate 11, which are inserted in the seabed soils to improve the horizontal anti-sliding resistance and vertical bearing capacity of the free-sliding seabed mudmat foundation. The skirts 14 can also improve the rigidity of the base plate 11. The lateral baffles 12 are fixed around the base plate to form an open hexahedral space. The top of the lateral baffles are configured with a plurality of screw holes (a) 13, which are used to fix the cover plate 3.

The upper foundation 2 is mainly comprised of an upper plate 21, a plurality of stop blocks 24, and a plurality of universal rolling ball bearings 25. The upper plate 21 is configured with a plurality of springs 22 around it. The size of the upper plate 21 is smaller than that of the open hexahedral space formed by the lateral baffles 12 and the base plate 11. The springs 22 are connected between the inner side of the lateral baffles 12 and the lateral side of the upper plate 21. The upper plate 21 is further configured with a plurality of dowel holes (a) 23. The stop blocks 24 are fixed on four corners of the upper surface of the upper plate 21 to limit the rotation of the upper foundation 2. The universal rolling ball bearings 25 are fixed to the bottom of the upper plate 21 and sit on the upper surface of the base plate 11. The subsea infrastructure 4 is configured on the upper surface of the upper plate 21, and a pipeline 5 is connected to the subsea infrastructure 4 to transport oil. The upper plate 21 is subjected to the horizontal push force generated by the pipeline 5 due to heating and pressurization during operation, during which the upper plate can slide on the base plate 11 through the universal rolling ball bearings 25. The horizontal slide of the upper plate 21 can release the axial force on the pipeline 5 due to heating and pressurization.

The cover plate 3 mainly comprises a flat plate 31 and a plurality of eyebolts 33. The flat plate 31 is configured with a mid-hole, allowing the subsea infrastructure 4 and the pipeline 5 to extend through the mid-hole. The flat plate 31 further has a plurality of screw holes (b) 32 to match the screw holes (a) 13 on the top of the lateral baffles 12. The flat plate 31 can be fixed to the lateral baffles 12 by screws through screw holes (b) 32 and screw holes (a) 13. The flat plate 31 further has a plurality of dowel holes (b) 34 to match the dowel holes (a) 23 on the upper plate 21. The upper foundation 2 can be fixed to the cover plate 3 by dowel pins 7 through dowel holes (a) 23 and dowel holes (b) 34. The eyebolts 33 are configured on the upper surface of the flat plate 31, which are used for installation and recovery of the free-sliding seabed mudmat foundation.

The height of the lateral baffle 12 should be greater than the total height of the upper plate 21, the universal rolling ball bearing 25, and the stop block 24. When the upper foundation 2 sits on the base plate 11, a height difference exists between the top of the lateral baffle 12 and the top of the stop block 24. The height difference allows the flat plate 31 to be fixed on the lateral baffles 12 without touching the stop blocks 24. After installing the flat plate 31 on the lateral baffles 12, a gap exists between the bottom of the flat plate 31 and the top of the stop block 24. The size of the gap should meet the following principles:

a) the gap should be large enough to ensure that the horizontal movement of the upper foundation 2 on the base plate 11 is not constrained by the flat plate 31; and b) under the condition of meeting principle a), the gap should be small enough to constrain the vertical movement of the stop blocks 24, and to avoid the movement outside the horizontal movement for the upper foundation 2.

The springs 22 are connected between the upper plate 21 and the lateral baffles 12. When the interaction force between the upper plate 21 and the lateral baffles 12 is zero, the springs 22 are not distorted. When an interaction exists between the upper plate 21 and the lateral baffles 12, the springs 22 are extended or compressed. The compression limit and tension limit of the spring 22 should not less than the maximum deformation of the pipeline 5 due to heating and pressurization. Moreover, the stiffness of the spring 22 should meet the following principle: the maximum restoring force of the spring 22 under compression limit or tension limit is less than the ultimate anti-sliding resistance of the free-sliding seabed mudmat foundation or the buckling load of the pipeline 5.

An anodic protection device 15 is configured at the inner side of the lateral baffle 12, which is used to prevent the corrosion of the free-sliding seabed mudmat foundation.

A damping device 6, including springs and dampers, is arranged between the subsea infrastructure 4 and the upper plate 21, which can be used to reduce the cyclic disturbance of the seabed soil caused by the vibration of the subsea infrastructure 4 during operation.

The skirts 14 are grilled skirts, cylindrical piles, or suction caissons.

The lateral baffles 12 are fixed to the base plate 11 through welding, rivets, or screws.

The springs 22 are connected between the upper plate 21 and the lateral baffles 12 through screws or rivets.

The universal rolling ball bearings 25 are connected to the bottom of the upper plate 21 by screws or rivets. The size and number of the universal rolling ball bearing 25 are determined based on practical requirements.

The stop block 24 is a universal rolling ball bearing.

During the installation process of the free-sliding subsea mudmat foundation, dowel pins 7 are sealed in dowel holes (a) 23 on the upper foundation 2 and dowel holes (b) 34 on the flat plate 31. After installation, a remotely operated vehicle (ROV) is used to pull the dowel pins 7 out from the dowel holes, allowing the upper foundation 2 to slide freely on the base plate 11.

During the recovery process of the free-sliding seabed mudmat foundation, a ROV is used to insert the dowel pins 7 to the dowel holes (a) 23 on the upper foundation 2 and dowel holes (b) 34 on the cover plate 3. The dowel pins 7 can avoid the sliding movement of the upper foundation 2 in the open hexahedral space formed by the base plate 11 and lateral baffles 12. The retrieved free-sliding seabed mudmat foundation can be re-used. Hence the free-sliding seabed mudmat foundation disclosed in the present invention is environmentally friendly.

Advantages of the Invention

The free-sliding subsea mudmat foundation in the present invention has a smaller size compared with that of conventional mudmats, which is beneficial in reducing the fabrication cost. The free-sliding subsea mudmat foundation can be transported and installed by the pipeline laying vessel, which results in a significant reduction in the transportation and installation costs. In the free-sliding subsea mudmat foundation, the upper foundation is allowed to freely slide to release the horizontal push force generated by the pipeline due to heating and pressurization, while the base foundation remains stable to avoid the disturbance of the seabed soils beneath the mudmat. Therefore, the axial load of the pipeline due to heating and pressurization is released to some extent, and hence the risk of buckling failure of the pipeline is reduced. Moreover, a damping device, including springs and dampers, is adopted in the mudmat to efficiently reduce the vibration of the subsea infrastructure, which is also effective in reducing the disturbance of the seabed soil beneath the mudmat.

1 base foundation; 2 upper foundation; 3 cover plate; 4 subsea infrastructure; 5 pipeline; 6 damping device; 7 dowel pin; 8 screw; 11 base plate; 12 lateral baffle; 13 screw hole (a); 14 skirt; 15 anodic protection device; 21 upper plate; 22 spring; 23 dowel hole (a); 24 stop block; 25 universal rolling ball bearing; 31 flat plate; 32 screw hole (b); 33 eyebolt; 34 dowel hole (b).

DETAILED DESCRIPTION OF THE INVENTION

For illustrative purposes, some of the presently preferred embodiments of the invention will now be described, with reference to the drawings.

1. Free-Sliding Subsea Mudmat Foundation

FIG. 1, FIGS. 2a-2c, and FIGS. 3a-3c show the free-sliding seabed mudmat foundation, which is mainly comprised of a base foundation 1, an upper foundation 2, and a cover plate 3. The base foundation 1 comprises a base plate 11, a plurality of lateral baffles 12 and a plurality of skirts 14. The base plate 11 sits on the seabed to support the dead weights of the free-sliding seabed mudmat foundation and the subsea infrastructure 4. The skirts 14 are symmetrically attached to the bottom of the base plate 11, which are inserted in the seabed soils to improve the horizontal anti-sliding resistance and vertical bearing capacity of the free-sliding seabed mudmat foundation. Hence the stability of the free-sliding seabed mudmat foundation is improved. The skirts 14 can also improve the rigidity of the base plate 11. The size of the base plate 11 should be large enough to provide enough vertical bearing capacity to support the free-sliding subsea mudmat foundation and the subsea infrastructure. The ultimate vertical bearing capacity of the free-sliding subsea mudmat foundation can be calculated by Eq. (1).

$$F_u = N_c s_{um} A \qquad (1)$$

where $F_u$ is the ultimate vertical bearing capacity of the free-sliding seabed mudmat foundation; $N_c$ is the bearing capacity factor, which is associated with the aspect ratio of the base plate 11, the shape and size of the skirts 14, the heterogeneity of the seabed soil, and many other factors; $s_{um}$ is the undrained shear strength of the seabed soil; and A is the projected area of the base plate. Generally, the total weight of the free-sliding subsea mudmat foundation and the subsea infrastructure 4, W, should be less than $0.5F_u$. Therefore, the size of the base plate 11 can be determined by Eq. (1) based on the summary of the total weight of the free-sliding seabed mudmat foundation and the subsea infrastructure.

Figure 2A:
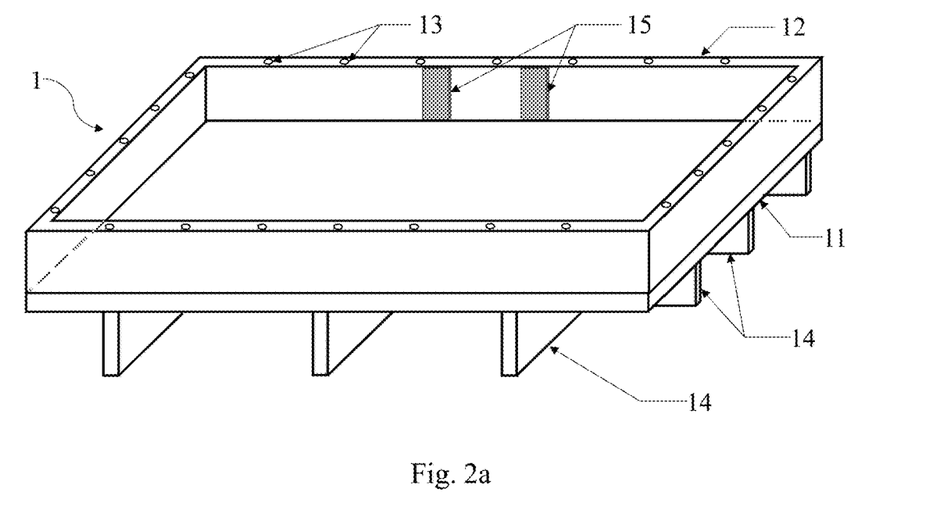
FIG. 2a shows the base foundation.

The lateral baffles 12 are fixed around the base plate 11 through welding, rivets, or screws. An anodic protection device 15 is configured at the inner side of the lateral baffle 12, which is used to prevent the corrosion of the free-sliding seabed mudmat foundation.

Figure 2B:
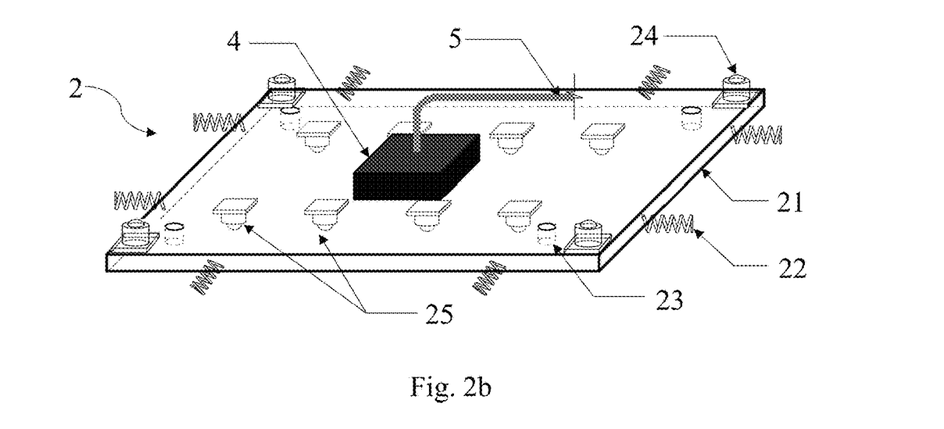
FIG. 2b shows the upper foundation.

The upper foundation 2 comprises an upper plate 21, a plurality of stop blocks 24, and a plurality of universal rolling ball bearings 25. The upper plate 21 is used to support the subsea infrastructure 4. The upper plate 21 is configured with a plurality of springs 22 around it. The springs 22 are connected between the inner side of the lateral baffles 12 and the lateral side of the upper plate 21. When the interaction force between the upper plate 21 and the lateral baffles 12 is zero, the springs 22 are not distorted. When an interaction exists between the upper plate 21 and the lateral baffles 12, the springs 22 are extended or compressed. The springs 22 are connected to the upper plate 21 and lateral baffles 12 through screws or rivets.

The expansion of the pipeline 5, connected to the subsea infrastructure 4, due to heating and pressurization can be calculated by Eq. (2).

$$\Delta l = \alpha_l \cdot l \cdot \Delta T \qquad (2)$$

where $\Delta l$ is the expansion of the pipeline; $\alpha_l$ is the linear expansion coefficient of the pipeline; $\Delta T$ is the temperature difference between the pipeline during operation and the seabed. The compression limit or tension limit of the spring 22 should not less than the maximum expansion of the pipeline 5 due to heating and pressurization.

The stiffness of the springs 22 should meet the following principle: the maximum restoring force of the springs 22 under compression limit or tension limit is less than the ultimate horizontal resistance, $F_H$, of the free-sliding subsea mudmat foundation.

The maximum restoring force of the spring under compression limit or tension limit is calculated by Eq. (3).

$$F_{s,u} = k \Delta d_u \qquad (3)$$

where $F_{s,u}$ is the restoring force of the spring under compress limit or tension limit; k is the rigidity coefficient of the springs; and $\Delta d_u$ is the compression limit or tension limit of the spring.

The stiffness of the springs 22 should further meet the following principle: the maximum restoring force of the springs 22 under compression limit or tension limit is less than the buckling load of the pipeline 5.

The relationship between the distortion of the pipeline 5 and the restoring force of the springs can be calculated by Eq. (4).

$$\Delta l = \frac{F_N l}{EA} + \frac{F_N}{k} \qquad (4)$$

where $F_N$ is the restoring force of the springs; E is the modulus of the pipeline; and A is the cross-sectional area of the pipeline. When the expansion of the pipeline 5 achieve the maximum, the restoring force of the springs should reach the maximum (i.e. $F_N = F_{s,u}$) and should be less than the buckling load of the pipeline, as shown in Eq. (5).

$$F_{s,u} \leq [F_{buckling}] \qquad (5)$$

where $F_{buckling}$ is the buckling load of the pipeline. Note the spring rigidity k in Eq. (3) and Eq. (4) is the total rigidity of the springs. The number of the spring 22 should be determined based on practical requirements and Eqs. (3~4).

The anti-sliding resistance of the free-sliding subsea mudmat foundation is provided by two parts: the base plate 11 and the skirts 14. The anti-sliding resistance of the free-sliding subsea mudmat foundation can be determined based on the shape and size of the skirts 14, the strength of the seabed soil, the area of the base plate 11, etc.

The upper plate 21 is configured with a plurality of dowel holes (a) 23, which can be used to fix the upper foundation 2 during installation and recovery of the free-sliding seabed mudmat foundation.

Figure 4:
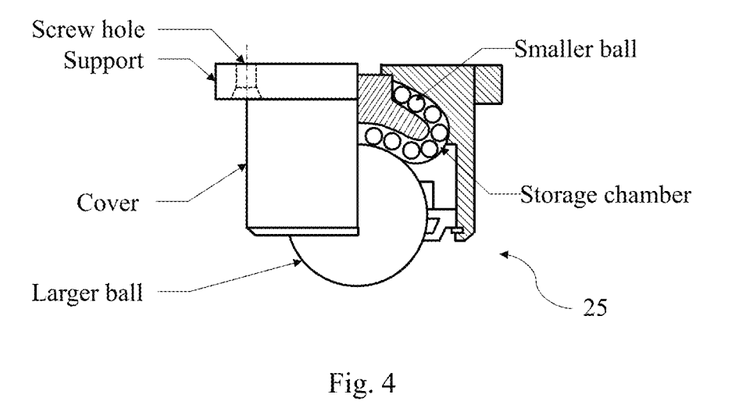
FIG. 4 shows the universal rolling bearing ball beneath the upper foundation.

FIG. 4 shows the universal rolling ball bearings 25, which is comprised of a larger ball, a support, a cover, a storage chamber, and a plurality of smaller balls. The universal rolling ball bearing 25, which can rotate towards any direction, is fixed to the bottom of the upper plate 21 through screws, rivets or other methods. The size and number of the universal rolling ball bearing 25 should be determined based on practical requirements. The universal rolling ball bearings 25 are located on the upper surface of the base plate 11, allowing the upper plate 21 to slide on the base plate 11 resulted from the horizontal push force on the upper plate 21 generated by the pipeline 5 due to heating and pressurization. Then the axial load in the pipeline 5 due to heating and pressurization is released to some extent.

The stop blocks 24 are fixed on four corners of the upper surface of the upper plate 21 to limit the movement outside the horizontal movement for the upper foundation 2.

Figure 2C:
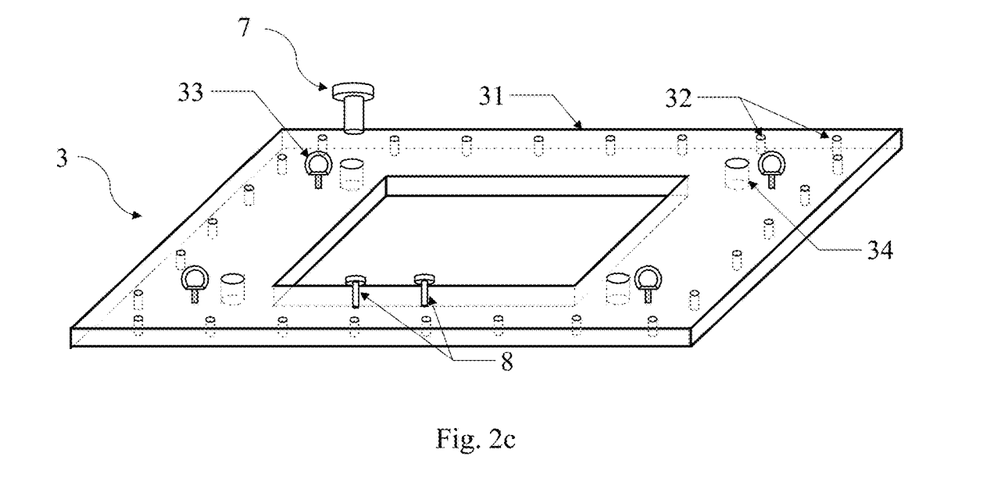
FIG. 2c shows the cover plate.

The cover plate 3 further comprises a flat plate 31 and a plurality of eyebolts 33. The flat plate 31 is configured with a mid-hole, allowing the subsea infrastructure 4 and the pipeline 5 to extend through the mid-hole. The flat plate 31 further has a plurality of screw holes (b) 32 to match the screw holes (a) 13 on the top of the lateral baffles 12. The flat plate 31 can be fixed to the lateral baffles 12 by screws 8 through screw holes (b) 32 and screw holes (a) 13. The flat plate 31 further has a plurality of dowel holes (b) 34 to match the dowel holes (a) 23 on the upper plate 21. The upper foundation 2 can be fixed to the cover plate 3 by dowel pins 7 through dowel holes (a) 23 and dowel holes (b) 34. The eyebolts 33 are configured on the upper surface of the flat plate 31, which are used for installation and recovery of the free-sliding subsea mudmat foundation.

Figure 3A:
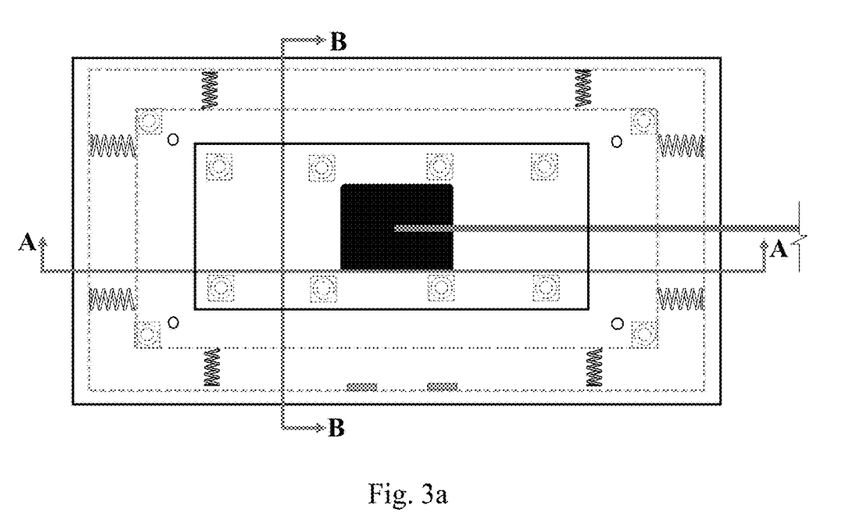
FIG. 3a shows a top view of the free-sliding subsea mudmat foundation.
Figure 3B:
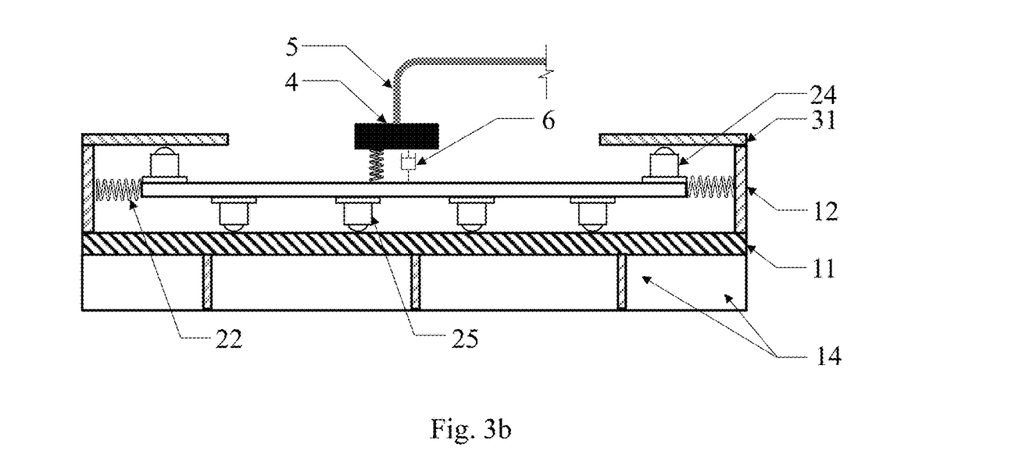
FIG. 3b shows the cross-sectional view (A-A) of the free-sliding subsea mudmat foundation.
Figure 3C:
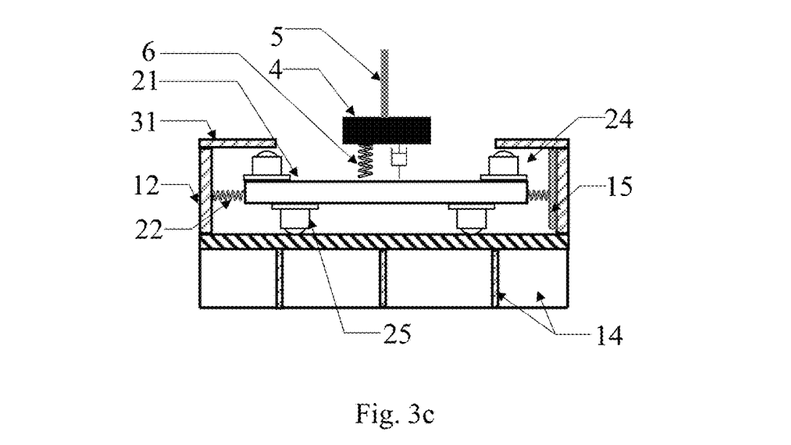
FIG. 3c shows the cross-sectional view (B-B) of the free-sliding subsea mudmat foundation.

The height of the lateral baffles 12 should be greater than the total height of the upper plate 21, the universal rolling ball bearing 25, and the stop block 24. When the upper foundation 2 sits on the base plate 11, a height difference exists between the top of the lateral baffles 12 and the top of the stop block 24. The height difference allows the flat plate 31 to be fixed on the lateral baffles 12 without touching the stop blocks 24. After installing the flat plate 31 on the lateral baffles 12, a gap exists between the bottom of the flat plate 31 and the top of the stop block 24. The size of the gap should meet the following principles:
- a) the gap should be large enough to ensure that the horizontal movement of the upper foundation 2 on the base plate 11 is not constrained by the flat plate 31; and
- b) under the condition of meeting principle a), the gap should be small enough to constrain the vertical movement of the stop blocks 24, and to avoid the movement outside the horizontal movement for the upper foundation 2.

Figure 5A:
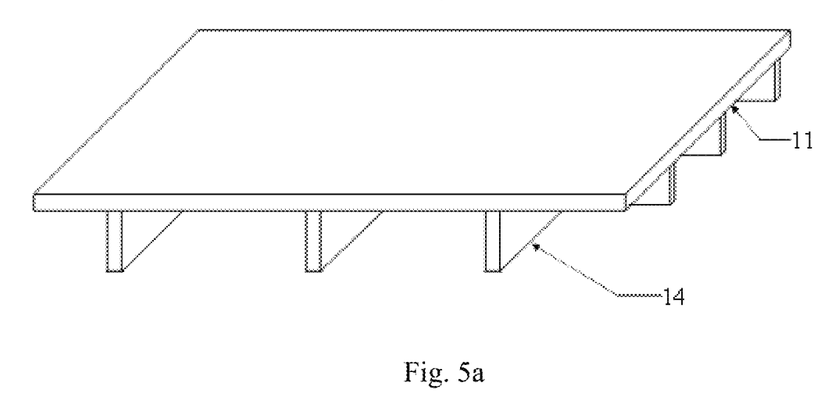
FIG. 5a and FIG. 5b show the grilled skirts beneath the base plate.
Figure 5B:
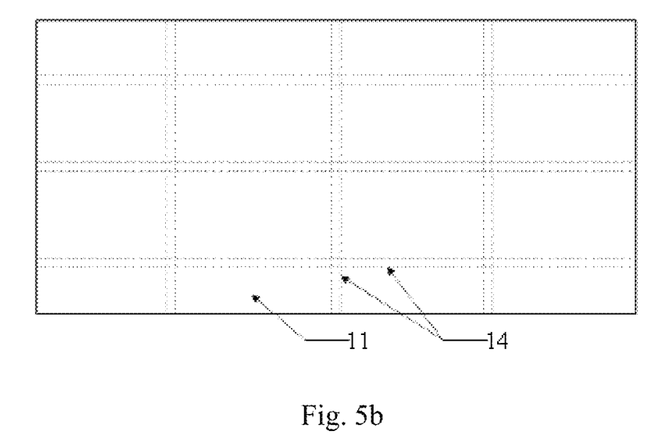
Figure 5C:
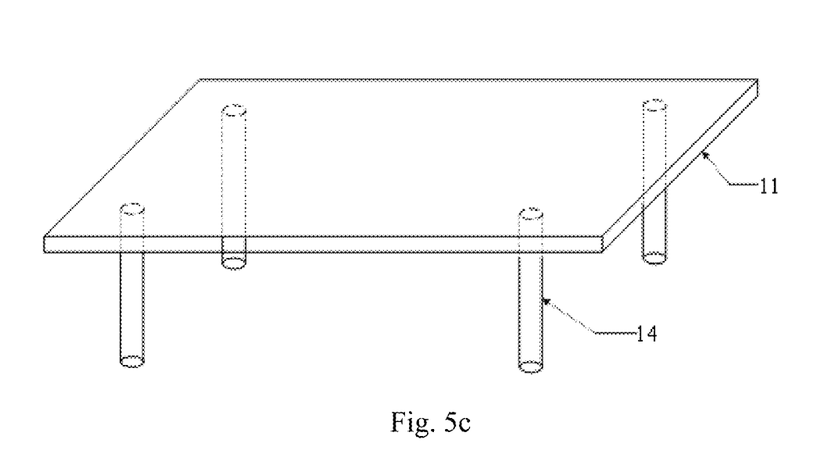
FIG. 5c and FIG. 5d show the cylindrical piles beneath the base plate.
Figure 5D:
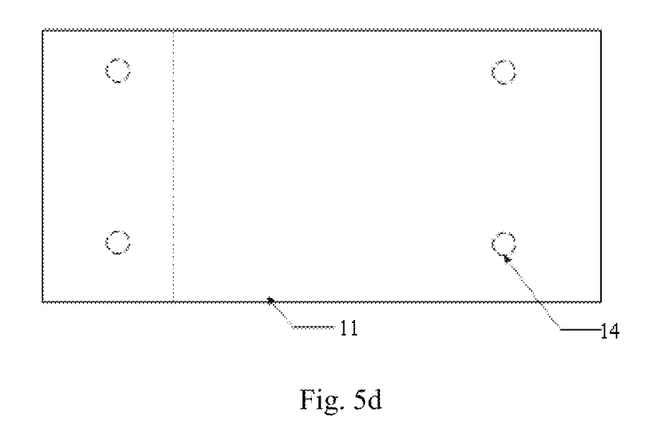

The skirts 14 are inserted in the seabed soils, which can be used to improve the anti-sliding resistance and vertical bearing capacity of the free-sliding subsea mudmat foundation. The skirts 14 can be designed with varied shapes. For instance, grilled skirts, cylindrical piles, or suction caissons can be used as skirts. FIG. 5a and FIG. 5b show the grilled skirts beneath the base plate 11. FIG. 5c and FIG. 5d show the cylindrical piles beneath the base plate 11. Both the grilled skirts and cylindrical piles are helpful in improving the anti-sliding resistance and vertical bearing capacity of the free-sliding seabed mudmat foundation, and hence the stability of the free-sliding seabed mudmat foundation is improved.

Figure 1:
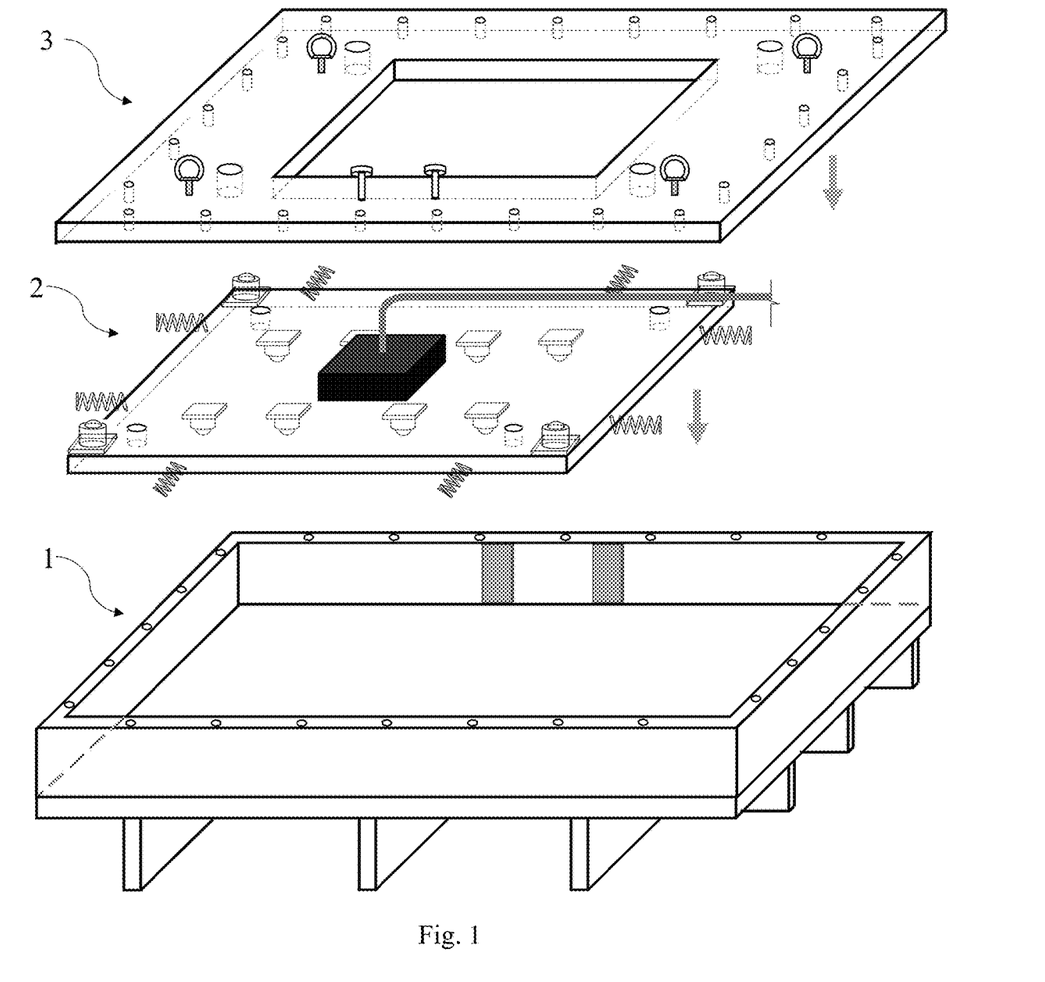
FIG. 1 shows the configuration of the free-sliding subsea mudmat foundation.

A damping device 6, including springs and dampers, is arranged between the subsea infrastructure 4 and the upper plate 21. The damping device 6 can be used to reduce the effect of the vibration of the subsea infrastructure 4 on the pipeline 5. In addition, the damping device 6 is also helpful in reducing the cyclic disturbance of the seabed soil caused by the vibration of the subsea infrastructure 4 during operation. The parameters of the springs and dampers of the damping device 6 should be designed based on the requirements of the subsea infrastructure.

2. Installation of the Free-Sliding Subsea Mudmat Foundation

A method installing the free-sliding subsea mudmat foundation, comprising the following steps.
- a) place the upper foundation 2 on the base plate 11 of the base foundation 1; and connect the upper plate 21 and lateral baffles 12 by springs 22; then fix the flat plate 31 to the lateral baffles 12 by screws 8; and then fix the upper foundation 2 to the flat plate 31 with dowel pins 7 through dowel holes (a) 23 and dowel holes (b) 34;
- b) install the free-sliding subsea mudmat foundation by using a crane or hoist on the pipeline laying vessel, and the free-sliding subsea mudmat foundation can be vertically released (i.e. the plane of the long side and short side of the base plate 11 is vertical) or horizontally released (i.e. the plane of the long side and short side of the base plate 11 is horizontal) in the seawater based on practical requirement;
- c) extract the dowel pins 7 by using a ROV after installing the free-sliding subsea mudmat foundation, allowing the upper foundation 2 to slide on the base plate 11;
- d) trigger the anodic protection system 15 to avoid corrosion of the free-sliding seabed mudmat foundation in the seawater.

3. Recovery of the Free-Sliding Subsea Mudmat Foundation

A method retrieving the free-sliding subsea mudmat foundation, comprising the following steps.
- a) seal dowel pins 7 in dowel holes (b) 34 on the flat plate 31 and dowel holes (a) 23 on the upper foundation 2; and
- b) connect retrieval lines to the eyebolts 33, allowing the free-sliding subsea mudmat foundation to be retrieved. The retrieved free-sliding seabed mudmat foundation can be re-used, which is environmentally friendly.

The invention claimed is:

1. A free-sliding seabed mudmat foundation, comprising:
a base foundation siting on a seabed to support dead weights of the free-sliding seabed mudmat foundation and a subsea infrastructure;
an upper foundation siting and sliding in an inner space of the base foundation; and
a cover plate fixed on a top of the base foundation;
said base foundation mainly comprises a base plate, a plurality of lateral baffles, and a plurality of skirts; the skirts are symmetrically attached to a bottom of the base plate to enhance a rigidity of the base plate, and are inserted in the seabed to improve a horizontal anti-sliding resistance and a vertical bearing capacity of the free-sliding seabed mudmat foundation; the lateral baffles are fixed around the base plate to form an open hexahedral space, and a top of the lateral baffles further has a plurality of screw holes to fix the cover plate;
said upper foundation further comprises an upper plate, a plurality of stop blocks, and a plurality of universal rolling ball bearings; the upper plate is configured with a plurality of springs around the upper plate and is configured with a plurality of dowel holes on the upper plate, and the upper plate has a size smaller than a size of the open hexahedral space formed by the lateral baffles and the base plate; the springs are connected between an inner side of the lateral baffle and a lateral side of the upper plate; the stop blocks are fixed on four corners of an upper surface of the upper plate to limit a rotation movement of the upper foundation; the universal rolling ball bearings are fixed on a bottom of the upper plate and sit on an upper surface of the base plate; the subsea infrastructure is configured on the upper surface of the upper plate to connect an end of a pipeline to transport oil; a horizontal push force acts on the upper plate generated by the pipeline due to heating and pressurization during operation, causing the upper plate to slide on the base plate through the universal rolling ball bearings, and to release a axial force on the pipeline due to heating and pressurization;
said cover plate further comprises a flat plate with a mid-hole, allowing the subsea infrastructure and the pipeline to extend through the mid-hole, and a plurality of eyebolts configured on an upper surface of the flat plate for installation and recovery of the free-sliding seabed mudmat foundation; the flat plate further has a plurality of screw holes to match the screw holes on the top of the lateral baffles, and to fix the flat plate to the lateral baffles; and the flat plate further has a plurality of dowel holes to match the dowel holes on the upper plate, and to fix the upper foundation to the cover plate through dowel pins.

2. The free-sliding seabed mudmat foundation according to claim 1, wherein a height of the lateral baffle is greater than a total height of the upper plate, the universal rolling ball bearing, and the stop block; when the upper foundation sits on the base plate, a height difference exists between the top of the lateral baffle and a top of the stop block, causing a gap between a bottom of the flat plate and the top of the stop block with the flat plate being fixed on the lateral baffles; the gap between the bottom of the flat plate and the top of the stop block has a size meeting following principles:
- a) the gap has a size to ensure a horizontal movement of the upper foundation on the base plate is not constrained by the flat plate;
- b) under a condition of meeting principle a), the gap has a size to constrain a vertical movement of the stop blocks by the flat plate, and to avoid a movement outside the horizontal movement of the upper foundation.

3. The free-sliding seabed mudmat foundation according to claim 1, wherein the springs have a compression limit and a tension limit that is not less than a maximum deformation of the pipeline due to heating and pressurization; and the springs further have a rigidity meeting a following principle: a maximum restoring force of the springs under compression limit or tension limit that is less than an ultimate anti-sliding horizontal resistance of the free-sliding seabed mudmat foundation or a buckling force of the pipeline.

4. The free-sliding seabed mudmat foundation according to claim 3, further comprising an anodic protection device configured at the inner side of the lateral baffle to prevent corrosion of the free-sliding seabed mudmat foundation.

5. The free-sliding seabed mudmat foundation according to claim 3, further comprising a damping device arranged between the subsea infrastructure and the upper plate to reduce a cyclic disturbance of a seabed soil caused by a vibration of the subsea infrastructure during operation; said damping device is further comprised of springs and dampers.

6. The free-sliding seabed mudmat foundation according to claim 1, further comprising an anodic protection device configured at the inner side of the lateral baffle to prevent corrosion of the free-sliding seabed mudmat foundation.

7. The free-sliding seabed mudmat foundation according to claim 6, further comprising a damping device arranged between the subsea infrastructure and the upper plate to reduce a cyclic disturbance of a seabed soil caused by a vibration of the subsea infrastructure during operation; said damping device is further comprised of springs and dampers.

8. The free-sliding seabed mudmat foundation according to claim 1, further comprising a damping device arranged between the subsea infrastructure and the upper plate to reduce a cyclic disturbance of a seabed soil caused by a vibration of the subsea infrastructure during operation; said damping device is further comprised of springs and dampers.

9. The free-sliding seabed mudmat foundation according to claim 1, wherein said skirts are grilled skirts, cylindrical piles, or suction caissons; and wherein said stop block is a universal rolling ball bearing.

10. The free-sliding seabed mudmat foundation according to claim 9, wherein the lateral baffles and the base plate are fixed through welding, rivets, or screws; wherein the springs are connected between the upper plate and the lateral baffle through screws or rivets; wherein the universal rolling ball bearings are connected to the bottom of the upper plate by screws or rivets; and a size and a number of the universal rolling ball bearing are determined based on practical requirements.

* * * * *